Figure 1:
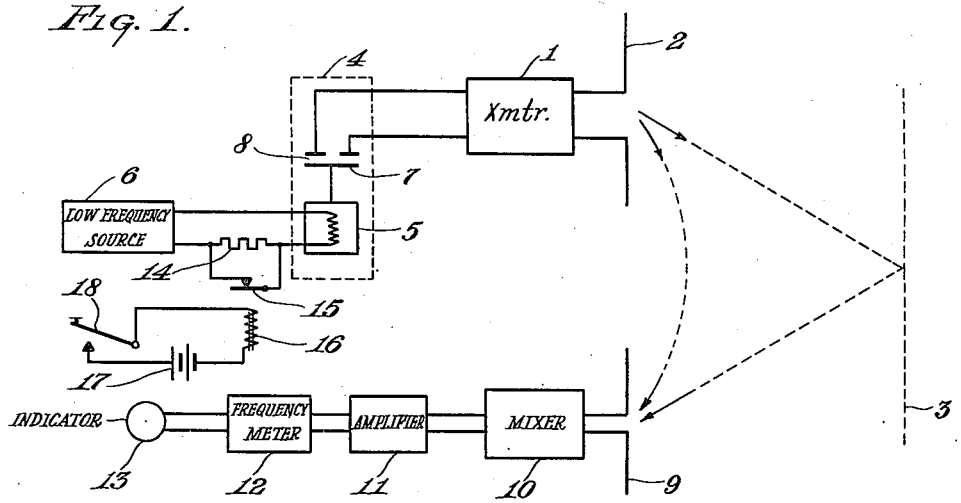

April 25, 1950     C. J. H. A. STAAL ET AL     2,505,692
DUAL RANGE FREQUENCY-MODULATED RADIO ALTIMETER
Filed May 9, 1946     2 Sheets-Sheet 1

CORNELIS JOHANNES HENRICUS ANTONIUS STAAL
HENDRICK VAN DER WEG.
INVENTORS.

BY

ATTORNEY.

Patented Apr. 25, 1950

2,505,692

UNITED STATES PATENT OFFICE 2,505,692

DUAL RANGE FREQUENCY-MODULATED RADIO ALTIMETER

Cornelis Johannes Henricus Antonius Staal and Hendrik van de Weg, Eindhoven, Netherlands, assignors, by mesne assignments, to Hartford National Bank and Trust Company, Hartford, Conn., as trustee Application May 9, 1946, Serial No. 668,532
In the Netherlands June 10, 1942
Section 1, Public Law 690, August 8, 1946
Patent expires June 10, 1962

5 Claims. (Cl. 343—14)

The present invention relates to a distance meter, more particularly an altimeter, provided with at least two measuring ranges, in which frequency modulated oscillations are emitted at the measuring station and the frequency of the beats between the emitted oscillations and the oscillations received after reflection by a reflecting surface determines the distance between the measuring station and the reflecting surface.

The invention is characterized by the fact that the transition to the lowest and highest range respectively of two neighbouring measuring ranges takes place by bringing the maximum frequency deviation of the frequency modulated oscillations to be transmitted to a higher and lower value respectively.

The transition to another measuring range preferably takes place in accordance with the average beat frequency between the emitted oscillations and the oscillations received after reflection.

With distance meters of the kind to which the present invention relates it has already been proposed to effect the transition from one of the measuring ranges of the indicating device, indicating the distance to be measured, to a neighbouring range automatically in accordance with a voltage depending on the distance to be measured. In this case the change-over of the measuring range is effected by modification of the sensitiveness of the indicating instrument to which the beat frequency is supplied.

The expedient according to the invention for changing over the measuring range has the advantage over the devices referred to that for at least a part of the distances to be measured the bandwidth required for transmitting the beat between the emitted oscillations and the reflected oscillations is smaller so that with the same amplification the noise is weaker.

In fact, with a distance meter of the type according to the present invention the average frequency of the beat between the emitted oscillations and the oscillations received after reflection increases proportionally to the distance which requires that the device for transmitting the beat must have a bandwidth corresponding at least to the maximum beat frequency which appears with the largest distance to be measured. With large distances to be measured the amplitude of the beat is small so that strong amplification is necessary. However, the maximum amplification and consequently the maximum distance to be measured is limited by the noise occurring in the amplifier, which is considerable owing to the large bandwidth which the amplifier must have.

Inasmuch as the extent of frequency deviation, in a radio altimeter in accordance with the invention, is reduced when switching from one altitude measuring range to the next higher range, the amplifier bandwidth required for passing the beat resulting in the higher range is narrower. Consequently, with the same degree of amplification a more favorable signal-to-noise ratio is obtained with the narrower bandwidth in the higher range as against the broader bandwidth in the lower range.

Figure 2:
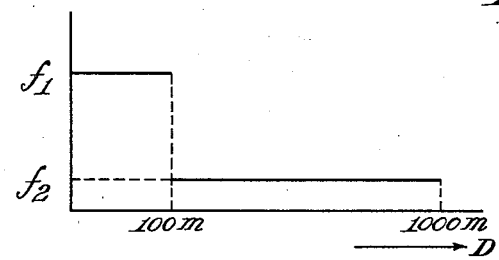
Figure 3:
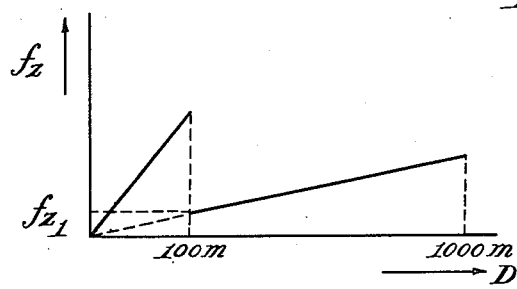
Figure 4:
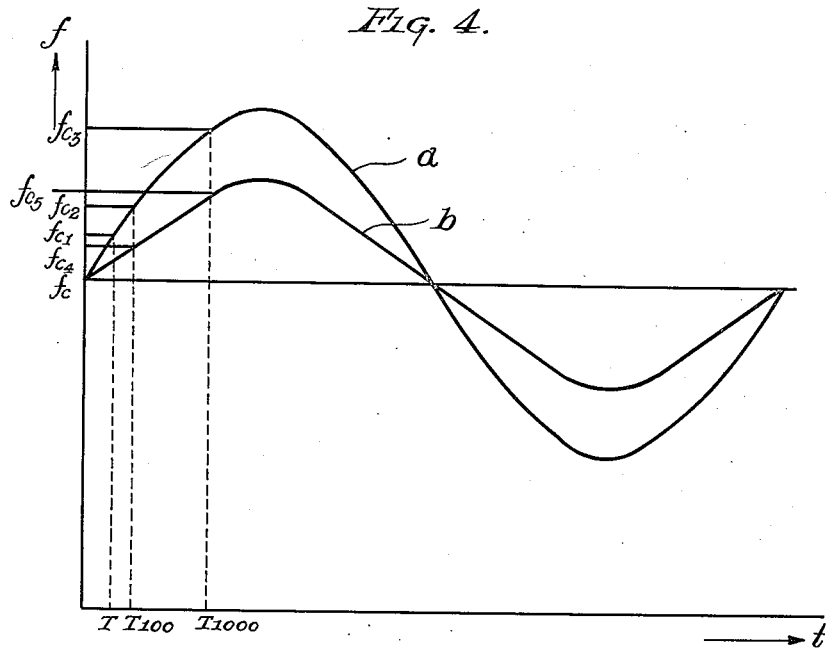
Figure 5:
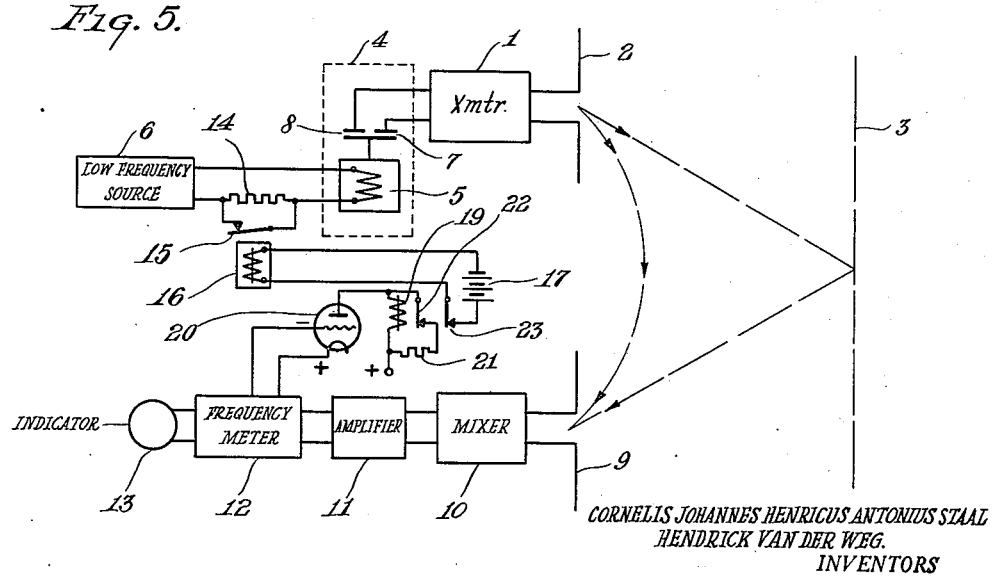

The invention will be more fully explained by reference to the accompanying drawing, given by way of example, in which Figure 1 represents one form of construction of a distance meter according to the invention, in which the change-over of the measuring range takes place manually, Figures 2, 3 and 4 representing curves by means of which the operation of the device shown in Figure 1 will be explained and Figure 5 showing one form of construction of a device according to the invention with automatic change-over of the measuring range.

In the form of construction shown in Figure 1 frequency modulated oscillations are emitted at the measuring station by a transmitter 1 through an antenna 2 in the direction of a reflecting surface 3 of which the distance has to be determined relative to the measuring station. The frequency modulation of the transmitter is obtained by means of a frequency modulator 4 consisting of a magnet system 5 which is energised by an alternating current, for instance of 50 cycles, originating from a supply 6. This magnet system causes a periodical oscillating motion of a movable condenser electrode 7 of a condenser 8 by which is brought about a capacity variation of this condenser. The said condenser 8 forms part of a tuned circuit of the transmitter as a result of which the frequency of the oscillations produced by the transmitter varies in accordance with the frequency of the supply 6.

The emitted frequency-modulated oscillations strike the surface 3 where they are reflected. The oscillations received after reflection by a receiving antenna 9, together with oscillations appearing in the antenna 9 by direct radiation of the antenna 2, are supplied to a mixing stage 10. Owing to the difference in length of the paths covered by the oscillations received by direct radiation and the oscillations received after reflection, a frequency difference steadily exists between the two received oscillations, so that in the output circuit of the mixing stage 10 an oscillation occurs having the difference frequency between the two oscillations, the average of which difference frequency is a measure of the distance between the measuring station and the reflecting surface. The beat frequency appearing in the output circuit of the mixing stage is supplied, through an amplifier 11, to a frequency meter 12 which is provided with an indicator 13 giving an indication which is proportional to the distance to be determined.

The device referred to has two measuring ranges of which the lower range extends from 0 to 100 meters and the higher range from 100 to 1000 meters and more.

According to the invention change-over to the higher and lower range respectively of the two measuring ranges is effected by bringing the maximum frequency deviation of the frequency-modulated oscillations to be transmitted to a lower and higher value respectively. To this end the circuit, through which the oscillation produced by the supply 6 is supplied to the magnet system 5 comprises a resistance 14 which is short-circuited by a switch 15 in determining distances lying within the lower measuring range and whose short-circuit in determining distances lying within the higher measuring range is removed by opening the switch 15. The removal of the short-circuit of the resistance 14 causes the magnet system 5 to be energised with a smaller current due to which the amplitude, with which the condenser electrode 7 moves to and fro, becomes smaller. A smaller amplitude of the movement of the condenser electrode 7 bring about a smaller capacity variation of the condenser 8 as a result of which the maximum frequency deviation of the frequency-modulated oscillations emitted by the transmitter 1 decreases, as is shown in Figure 2 where the curve indicates the maximum frequency deviation as a function of the distance to be determined for a distance meter having two measuring ranges. As long as the distance to be measured is within the lower measuring range and lies between 0 and 100 meters the maximum frequency deviation is $f_1$ whereas in the case the distance to be determined exceeds 100 meters the maximum frequency deviation amounts to $f_2$.

In Figure 3 the average beat frequency $f_z$, which occurs in the output circuit of the mixing stage 10, is indicated as a function of the distance D to be determined. When this distance lies between 0 and 100 meters the average beat frequency increases with an increasing distance; when the distance to be determined exceeds 100 meters the short circuit of the resistance 14 is removed by means of the switch 15 as a result of which the beat frequency, owing to the smaller maximum frequency deviation of the transmitted frequency-modulated oscillations, is reduced to a smaller value $f_{z1}$, which value increases continuously with an increasing distance between 100 meters and say 1000 meters.

To make this more clear Figure 4 represents the frequency $f$ of the transmitted frequency-modulated oscillations as a function of the time $t$. If the frequency of the unmodulated carrier wave is $f_c$ then the frequency will vary as a function of time, due to the modulation by the supply 6 with the resistance 14 being short circuited, as is shown by the curve $a$. Oscillations emitted by the transmitter 1 at the moment $t=0$ are received after a certain time $t=1$ which depends on the distance to be determined. In this time 1 the frequency of the frequency-modulated oscillations produced by the transmitter is altered and amounts, for instance, to $f_{c1}$ as a result of which a maximum beat frequency $f_{c1}-f_c$ appears in the receiver.

With a distance of say 100 meters the maximum beat frequency would then be, for instance, $f_{c2}-f_c$. If no change-over were to take place the maximum beat frequency would steadily increase with an increasing distance and, for instance with a distance of 1000 meters, amount to $f_{c3}-f_c$, in which case a bandwidth of $f_{c3}-f_c$ is necessary in the receiver.

If, however, with a distance of 100 meters the short circuit of the resistance 14 is removed the frequency of the transmitted oscillations will vary as a function of time due to modulation by the supply 5, as is shown by the curve $b$ in Figure 4, which curve shows a smaller maximum frequency deviation than the curve $a$.

Under these conditions the maximum beat frequency with a distance of 100 meters will be $f_{c4}-f_c$, which maximum beat frequency increases with an increasing distance and at a distance of say 1000 meters amounts to $f_{c5}-f_c$. In this case only a bandwidth of $f_{c5}-f_c$ is required in the receiver, which is much smaller than if no change-over of the maximum frequency deviation would take place.

In the device according to the invention the measuring range may be changed over either by hand, as is shown in Figure 1, or automatically in accordance with the average of the beat frequency between the emitted oscillations and the oscillations received after reflection.

In the device shown in Figure 1, in which change-over is effected by hand, the short circuit of the resistance 14 is removed or reduced by means of a relay 16 which is included in a circuit comprising a supply 17 and a manually operated switch 18, the relay in determining distances within the higher measuring range being energised by closing the switch 18 and the short circuit of the resistance 14 being removed, whereas with the switch 18 open the resistance 14 is short-circuited and the device adapted for measuring the distances within the lower measuring range.

In changing-over the measuring range automatically in accordance with a voltage depending on the average beat frequency this control voltage is preferably taken from the output circuit of the frequency meter 12, in which appears a voltage proportional to the average beat frequency, which voltage as a function of the distance to be measured has a similar variation as is indicated by the curve in Figure 3 and, with an increase exceeding the value corresponding to the largest distance within the lower measuring range, can be used for removing the short-circuit of the resistance 14, whereas with a decrease below the value corresponding to the smallest distance within the higher measuring range can be used for bringing about the short circuit of the resistance 14 by means of the relay 16.

If the control voltage in question is directly included in the energising circuit of the relay 16 the following phenomenon may occur on passing to another measuring range.

When, for instance, with an increasing distance between the measuring location and the reflecting surface the largest distance within the lower measuring range is attained the relay 16, since the control voltage taken from the frequency meter 12 exceeds the response voltage of the relay, is energised and the short circuit of the resistance 14 is removed as a result of which the maximum frequency deviation of the oscillations to be transmitted is reduced. This involves a decrease of the average frequency of the beat oscillation and consequently also a decrease of the control voltage which appears in the output circuit of the frequency meter 12 and is supplied to the relay 16. The decrease in control voltage caused by changing-over the measuring range may have such a value that this voltage falls below the de-energisation voltage of the relay, as a result of which the relay 16 is de-energised immediately after changing-over the measuring range and removes again the short circuit of the resistance 14, by which the change-over just effected is offset again. Since, however, the distance to be measured is larger than the largest distance in the lower measuring range the relay 16 is energised again and the process set out above is repeated periodically.

In order to avoid this undesirable phenomenon the changing-over of the measuring range in the circuit arrangement shown in Figure 5 is effected by means of a member which is controlled by the output voltage of the frequency meter 12 and whose sensitiveness, before changing-over the measuring range, is changed in such manner that the change-over is not offset by the variation of the control voltage which appears on changing-over the measuring range.

In this form of construction the said member is constituted by a relay 19 which is inserted in the output circuit of a discharge tube 20 to whose grid the output voltage of the frequency meter 12 is supplied with a negative polarity. For varying the sensitiveness of the relay 19 a resistance 21 is provided which by means of a break contact 22 can be connected in parallel with the coil of the relay. A second break contact 23 of the relay 19 is included in an electric circuit comprising a supply 17 and the relay 16 which upon energisation removes the short circuit of the resistance 14.

In determining distances within the lower measuring range the negative control voltage supplied to the tube 20 has such a small value that the anode current of the tube is sufficient to operate the relay 19. However, with an increase of the control voltage to above the value corresponding to the largest distance within the lower measuring range this is no longer the case and the relay 19 is released, as a result of which the contact 22 connects the restistance 20 in parallel with the relay 19, the contact 23 closing the circuit of the relay 16. By energisation of the relay 16 the short circuit of the resistance 14 is removed which involves a decrease of the received beat frequency; the negative grid voltage supplied to the grid of the tube 20 decreases and the anode current of the tube increases. However, by connecting the resistance 21 in parallel with the coil of the relay 19 the sensitiveness of this relay is reduced to such a degree that the relay is not operated in spite of the increase in energisation current, so that the change-over of the measuring range by removing the short circuit of the resistance 14 cannot be undone by the variation of the control voltage of the relay 19 which occurs in changing-over. In this case it is essential that the decrease in sensitiveness of the relay 19 occurs before changing-over of the measuring range takes place by reducing the maximum frequency deviation of the transmitted oscillations; in connection therewith the relay 16 performing the change-over is preferably retarded.

In determining distances within the higher measuring range the relay 19 is not operated despite the fact that anode current flows in the anode circuit of the tube 20. If, however, the distance to be measured falls below the smallest distance within the higher measuring range, which distance is generally smaller and is by no means larger than the largest distance within the lower measuring range the anode current of the tube 20 increases to the value which is sufficient for operating the relay 19, despite the reduced sensitiveness, as a result of which the parallel connection of the resistance 21 with the relay 19 and subsequently the short circuit of the resistance 14 is removed. Thus the maximum frequency deviation is brought to the value corresponding to the lower measuring range. However, the resultant increase of the negative control voltage supplied to the grid of the tube 20 does not involve release of the relay 19 since the sensitiveness of the relay 19 has previously been increased by cutting out the resistance 21. Thus it is avoided also in this case that the change-over is undone by the control voltage variation which appears in changing-over the measuring range.

We claim:

1. A radio altimeter having first and second altitude measuring ranges, the upper limit of the first range being common to the lower limit of the second range, said altimeter comprising means to transmit frequency-modulated waves to be reflected from the earth, a range switching circuit for abruptly changing the maximum frequency deviation of said waves from one value adapted for the first range to another value adapted for the second range, a receiver for receiving the frequency-modulated wave and for producing a signal corresponding to the difference in frequency of the transmitted and reflected waves, means connected to said receiver for deriving a control voltage whose amplitude is proportional to the frequency of said signal, and a relay system operated by said control voltage and arranged to actuate said range switching circuit, said relay system being energized by control voltage exceeding the magnitude thereof corresponding to the frequency of said signal obtained at the common limit of said ranges, said relay system further including means responsive to the energization of said system for reducing the sensitiveness of said relay system to the applied control voltage.

2. A radio altimeter having low and high altitude measuring ranges, the upper limit of the low range being common to the lower limit of the high range, said altimeter comprising means to transmit frequency-modulated waves to be reflected from the earth, range switching means for abruptly changing the maximum frequency deviation of said waves from a one value adapted for the low range to another value adapted for the high range, a receiver for receiving the frequency-modulated wave and for producing a signal corresponding in frequency to the difference in frequency of the transmitted and reflected waves, means connected to said receiver for deriving a control voltage whose amplitude is proportional to the frequency of said signal, and a relay system operated by said control voltage and arranged to actuate said range switching means, said system being responsive to a first predetermined magnitude of control voltage to effect changeover from the low to the high range and to a second predetermined magnitude of control voltage to effect changeover from the high to the low range, the difference between said first and second predetermined magnitudes of control voltage being greater than the variation in the control voltage occurring on the changeover in the range.

3. A radio altimeter having low and high altitude measuring ranges, the upper limit of the low range being common to the lower limit of the high range, said altimeter comprising means to transmit frequency-modulated waves to be reflected from the earth, said transmitter means including an adjustable condenser for varying the frequency thereof, electromagnetic means to vibrate said condenser, a source of alternating voltage to energize said electromagnetic means at a prescribed rate, a voltage dropping resistor interposed between said source and said electromagnetic means and a switch in shunt relation with said resistor, whereby in the condition where said switch is closed the maximum frequency deviation effected by said condenser is determined by the amplitude of said source and when said switch is open by the amplitude of said source as reduced by said resistor, said switch being closed in the low range and open in the high range, a receiver for receiving said transmitted waves directly and after reflection, means connected to said receiver for deriving from said receiver a control voltage proportional to the difference in frequency between the directly received waves and the reflected received waves, and a relay system arranged to actuate said switch, said system being responsive to a first predetermined magnitude of control voltage to effect changeover from the low to the high range and to a second predetermined magnitude of control voltage to effect changeover from the high to the low range, the difference between said first and second predetermined magnitudes of control voltage being greater than the variation in the control voltage occurring on the changeover in the range.

4. A radio altimeter having low and high altitude measuring ranges, the upper limit of the low range being common to the lower limit of the high range, said altimeter comprising means to transmit frequency-modulated waves to be reflected from the earth, said transmitted means including an adjustable condenser for varying the frequency thereof, electromagnetic means to vibrate said condenser, a source of alternating voltage to energize said electromagnetic means at a prescribed rate, a voltage dropping resistor interposed between said source and said electromagnetic means, and a first relay provided with a coil and a contact switch connected in shunt relation with said resistor whereby in the condition where said contact switch is closed the maximum frequency deviation effected by said condenser is determined by the amplitude of said source and when said contact switch is open by the amplitude of said source as reduced by said resistor, said switch being closed in the low range and open in the high range, a receiver for receiving said transmitted wave directly and after reflection, means connected to said receiver for deriving from said receiver a control voltage proportional to the difference in frequency between the directly received waves and the received reflected waves, a second relay having a coil and pair of contact switches and arranged for operation by said control voltage, a shunt resistance connected in series with one of said pair of contact switches across said coil of said second relay, and a potential supply connected in series with the other of said pair of contact switches and said coil of said first relay, said coil of said second relay in the absence of said shunt resistance being responsive to the control voltage corresponding to the signal obtained at the common limit of said ranges.

5. An arrangement as set forth in claim 4 further including retardation means in conjunction with said first relay whereby the operation of said first relay occurs after a time interval following the operation of said second relay.

CORNELIS JOHANNES HENRICUS
ANTONIUS STAAL.
HENDRIK van de WEG.

REFERENCES CITED

The following references are of record in the file of this patent:

UNITED STATES PATENTS

| Number | Name | Date |
|---|---|---|
| 2,222,586 | Sanders | Nov. 19, 1940 |
| 2,257,830 | Wolff et al. | Oct. 7, 1941 |
| 2,261,272 | Newhouse | Nov. 4, 1941 |